(12) United States Patent
Burenius

(10) Patent No.: US 11,076,251 B2
(45) Date of Patent: Jul. 27, 2021

(54) AUDIO SIGNAL PROCESSING BASED ON MICROPHONE ARRANGEMENT

(71) Applicant: Cisco Technology, Inc., San Jose, CA (US)

(72) Inventor: Lennart Burenius, Oslo (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/792,616

(22) Filed: Feb. 17, 2020

(65) Prior Publication Data
US 2021/0136505 A1 May 6, 2021

Related U.S. Application Data

(60) Provisional application No. 62/929,143, filed on Nov. 1, 2019.

(51) Int. Cl.
*H04R 3/00* (2006.01)
*H04R 1/02* (2006.01)
(Continued)

(52) U.S. Cl.
CPC ....... *H04R 29/005* (2013.01); *G06K 9/00228* (2013.01); *H04N 7/142* (2013.01);
(Continued)

(58) Field of Classification Search
CPC ........ H04R 29/005; H04R 1/028; H04R 1/04; H04R 1/406; H04R 3/005;
(Continued)

(56) References Cited

U.S. PATENT DOCUMENTS 8,437,490 B2    5/2013  Marton
9,210,499 B2   12/2015  Sun et al.
(Continued)

FOREIGN PATENT DOCUMENTS

CN    103995252 A    8/2014
CN    108344973 A    7/2018
JP    H1021047 A    1/1998

OTHER PUBLICATIONS

Infineon Technologies AG, "IM69D130", Dec. 19, 2017, 16 pages.
(Continued)

*Primary Examiner* — Ammar T Hamid
(74) *Attorney, Agent, or Firm* — Edell, Shapiro & Finnan, LLC

(57) ABSTRACT

In one example, a video endpoint obtains, from a vertical microphone array, a first audio signal including audio from a target sound source and audio from a horizontally-displaced sound source. The video endpoint obtains, from a horizontal microphone array, a second audio signal and a third audio signal both including the audio from the target sound source and the audio from the horizontally-displaced sound source. Based on the second audio signal and the third audio signal, the video endpoint determines at least one of a first degree of arrival of the audio from the target sound source or a second degree of arrival of the audio from the horizontally-displaced sound source. Based on the at least one of the first degree of arrival or the second degree of arrival, the video endpoint adjusts a gain of the first audio signal.

20 Claims, 13 Drawing Sheets

(51) Int. Cl.
*H04R 29/00* (2006.01)
*H04R 1/40* (2006.01)
*G06K 9/00* (2006.01)
*H04N 7/14* (2006.01)
*H04R 1/04* (2006.01)

(52) U.S. Cl.
CPC .............. *H04R 1/028* (2013.01); *H04R 1/04* (2013.01); *H04R 1/406* (2013.01); *H04R 3/005* (2013.01); *H04R 2201/403* (2013.01); *H04R 2499/15* (2013.01)

(58) Field of Classification Search
CPC .......... H04R 2201/403; H04R 2499/15; G06K 9/00228; H04N 7/142
USPC ...................................... 381/91, 92
See application file for complete search history.

(56) References Cited

U.S. PATENT DOCUMENTS

| | | | |
|---|---|---|---|
| 9,367,898 | B2 | 6/2016 | Jothiswaran et al. |
| 9,485,574 | B2 | 11/2016 | Sun et al. |
| 10,491,995 | B1 | 11/2019 | Enstad et al. |
| 2006/0034469 | A1 | 2/2006 | Tamiya et al. |
| 2006/0093128 | A1 | 5/2006 | Oxford |
| 2007/0116300 | A1 | 5/2007 | Chen |
| 2014/0211950 | A1 | 7/2014 | Neufeld et al. |
| 2017/0070814 | A1 | 3/2017 | Lu et al. |
| 2018/0176680 | A1* | 6/2018 | Knight .................. H04R 1/406 |

OTHER PUBLICATIONS

Cisco Systems, Inc., "Cisco SX10 Quick Set", C78-731274-15, Sep. 2018, 7 pages.
HP Development Company, LP, "HP EliteOne 800 G5 23.8-inch All-in-One", Oct. 2019, 4 pages.
HP Development Company, LP, "HP ENVY All-in-One PC 27-b207na", Aug. 2018, 3 pages.
AVer Information Inc., "EP65", Ordering SKU: IFEP65PC1, Jun. 20, 2019, 2 pages.
Lenovo, "Lenovo™ ThinkPad E475/E575", Oct. 14, 2016, 3 pages.
Willings, Adrian, "Facebook Portal Mini vs Portal vs Portal+ vs Portal TV: What's the difference?", Sep. 18, 2019, 20 pages.
Price, Molly, "Amazon Echo Show (2nd Gen) review: Bigger sound and better looks", Oct. 8, 2018, 7 pages.
Ashok Kumar Tellakula, "Acoustic Source Localization Using Time Delay Estimation", A Thesis Submitted for the Degree of Master of Science (Engineering) in Faculty of Engineering, Supercomputed Education and Research Centre, Indian Institute of Science, Bangalore—560 012 (India), Aug. 2007, 82 pages.
M. Omer, et al., "An L-shaped microphone array configuration for impulsive acoustic source localization in 2-D using orthogonal clustering based time delay estimation", Conference paper, Feb. 2013, DOI: 10.1109/ICCSPA.2013.6487241, ResearchGate, 7 pages.
Simon Doclo, et al., "Acoustic Beamforming for Hearing Aid Applications", Handbook on Array Processing and Sensor Networks, Feb. 2010, 34 pages.
Hidri Adel, et al., "Beamforming Techniques for Multichannel audio Signal Separation", JDCTA: International Journal of Digital Content Technology and its Applications, vol. 6, No. 20, arXiv:1212.6080v1, Dec. 2012, 9 pages.
Mark Aarts, et al., "Two Sensor Array Beamforming Algorithm", for Android Smartphones, Jul. 4, 2012, TUDelft, https://repository.tudelft.nl/islandora/object/uuid:7b7b6fda-3446-49ee-84b0-4b7540914b80, 45 pages.
Andrea Trucco, et al., "Maximum Constrained Directivity of Oversteered End-Fire Sensor Arrays", Sensors 2015, 15, 13477-13502; doi:10.3390/s150613477, www.mdpi.com/journals/sensors, ISSN 1424-8220, Jun. 9, 2015, 26 pages.
Application Note, "Microphone Array Beamforming", IvenSense, AN-1140-00, Revision 1.0, Dec. 31, 2013, 12 pages.
Yu Jingzhou, et al., "End-Fire Microphone Array Based on Phase Difference Enhancement Algorithm", ICSP2010, Oct. 24-28, 2010, Beijing, China, DOI: 10.1109/ICOSP.2010.5656250, 4 pages.
Barry D. Van Veen, et al., "Beamforming: A Versatile Approach to Spatial Filtering", IEEE ASSP Magazine, Apr. 1988, 21 pages.
International Search Report and Written Opinion in counterpart International Application No. PCT/US2020/057009, dated Jan. 27, 2021, 14 pages.

* cited by examiner

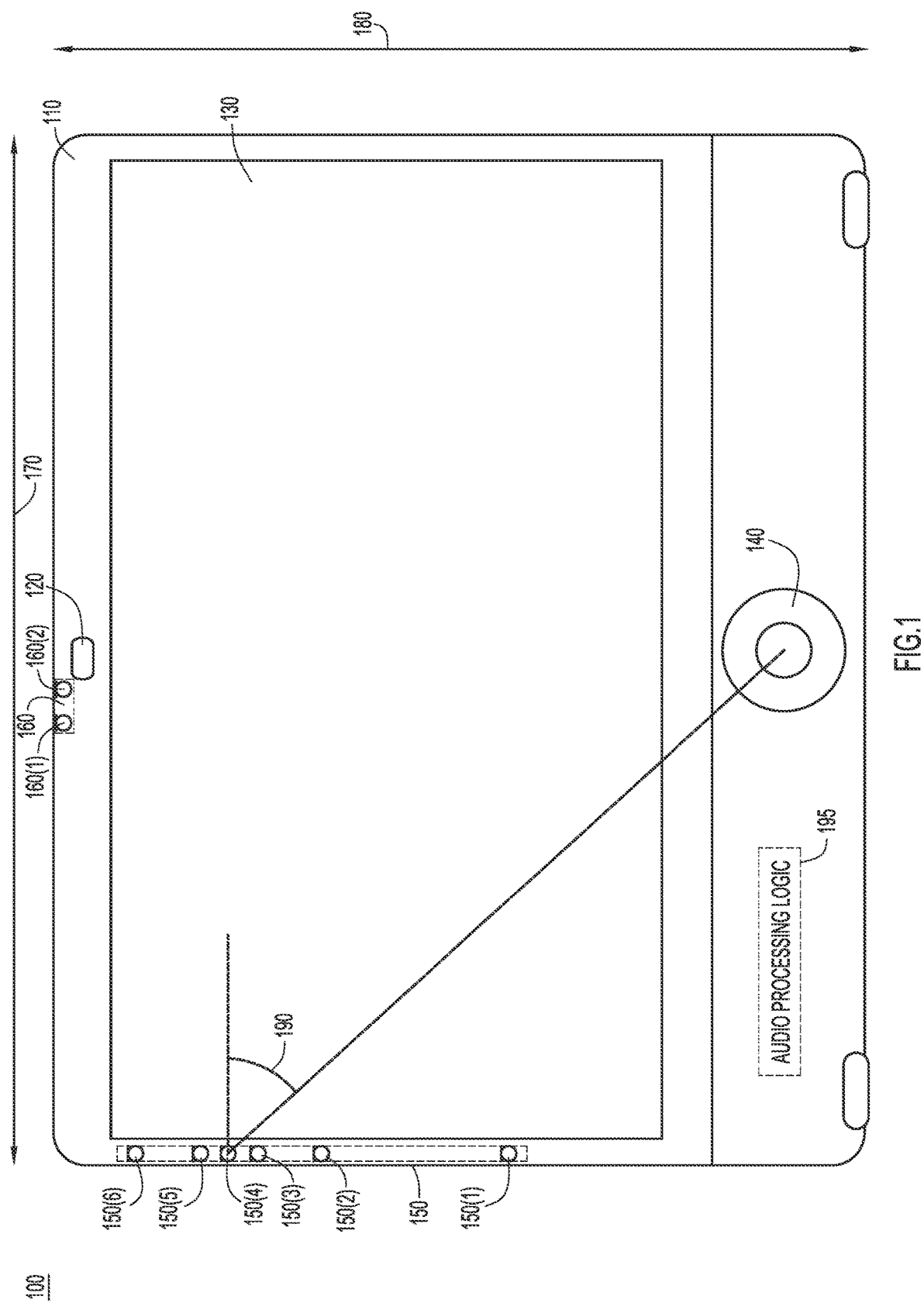

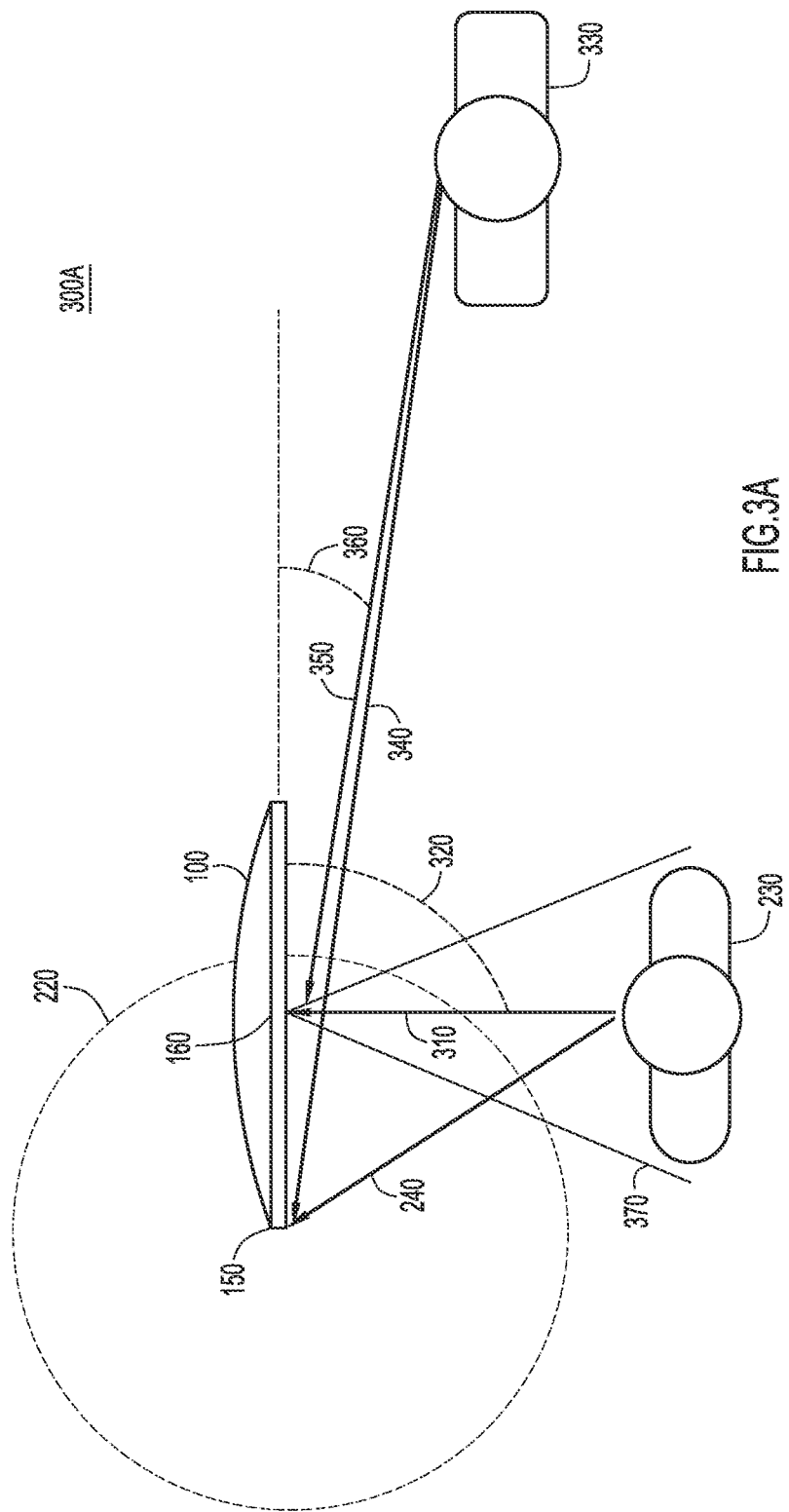

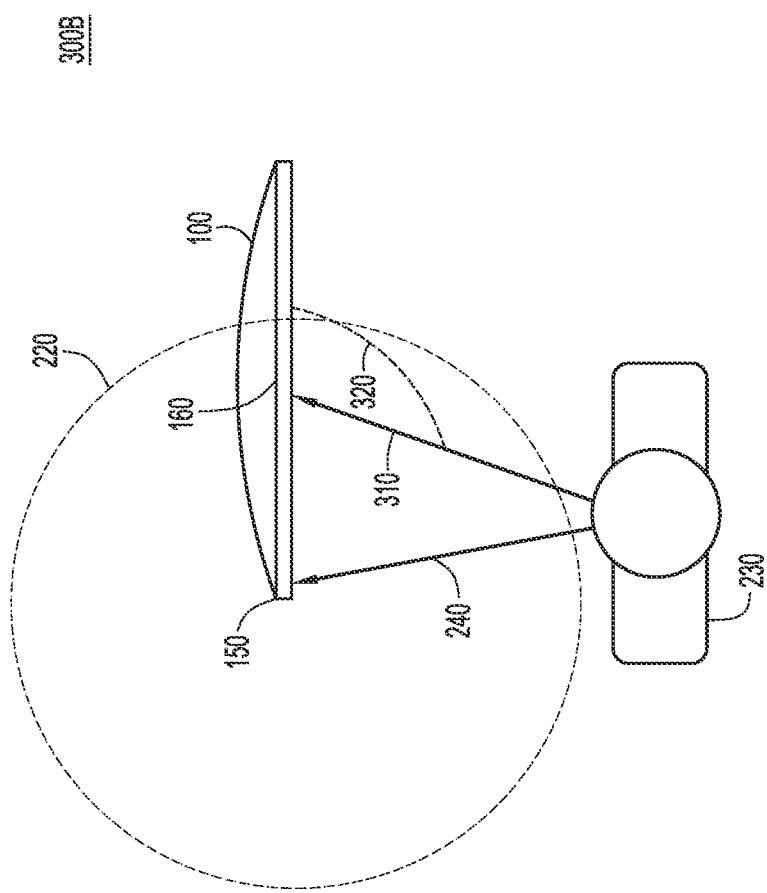

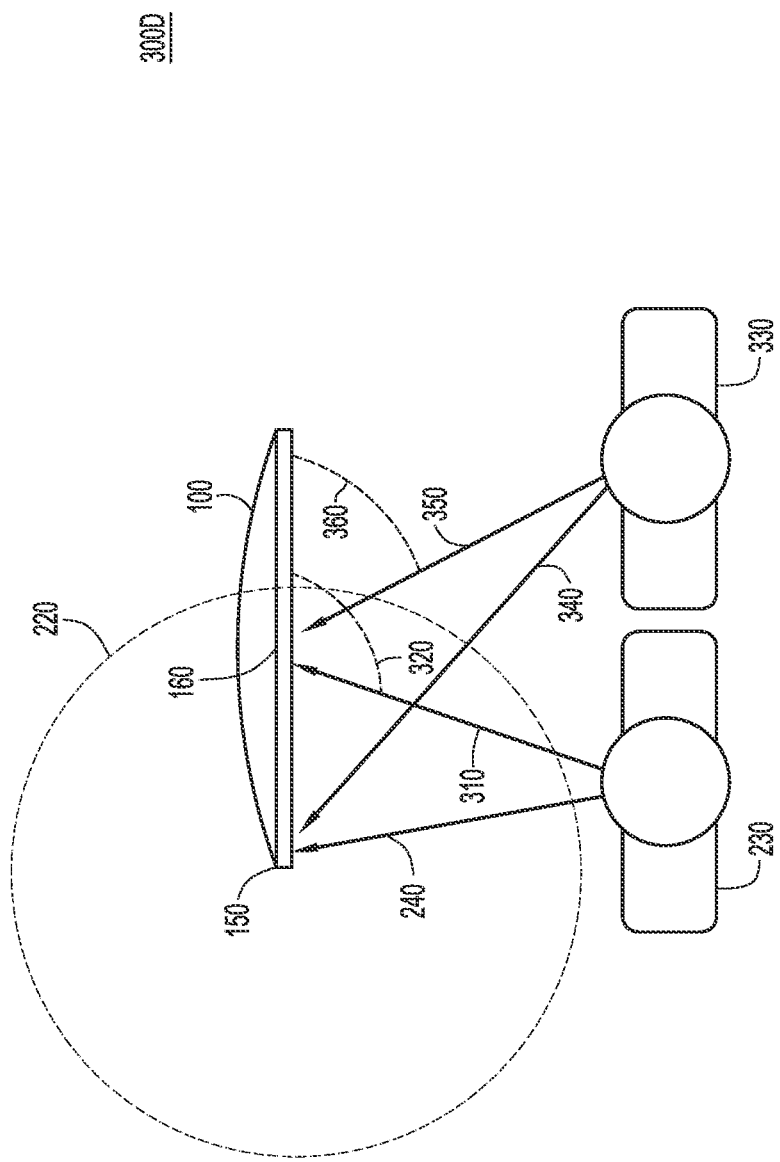

AUDIO SIGNAL PROCESSING BASED ON MICROPHONE ARRANGEMENT

CROSS REFERENCE TO RELATED APPLICATION

This application claims the priority to U.S. Provisional Application No. 62/929,143, filed Nov. 1, 2019, the entirety of which is incorporated herein by reference.

TECHNICAL FIELD

The present disclosure relates to video endpoints.

BACKGROUND

A video endpoint is an electronic device that can allow a user to teleconference with one or more remote users, often via one or more teleconferencing servers and additional video endpoints. Video endpoints can include various features to help facilitate a session or teleconference, such as one or more cameras, loudspeakers, microphones, displays, etc. Video endpoints are often utilized in professional (e.g., enterprise) settings.

BRIEF DESCRIPTION OF THE DRAWINGS

FIG. 1 illustrates a front view of a video endpoint configured to process audio signals based on a microphone arrangement of the video endpoint, according to an example embodiment.

FIGS. 3A-3D illustrate respective use case scenarios in which a video endpoint is configured to process audio signals based on a vertical microphone array of the video endpoint and a horizontal microphone array of the video endpoint, according to an example embodiment.

DESCRIPTION OF EXAMPLE EMBODIMENTS

Overview

Figure 2A:
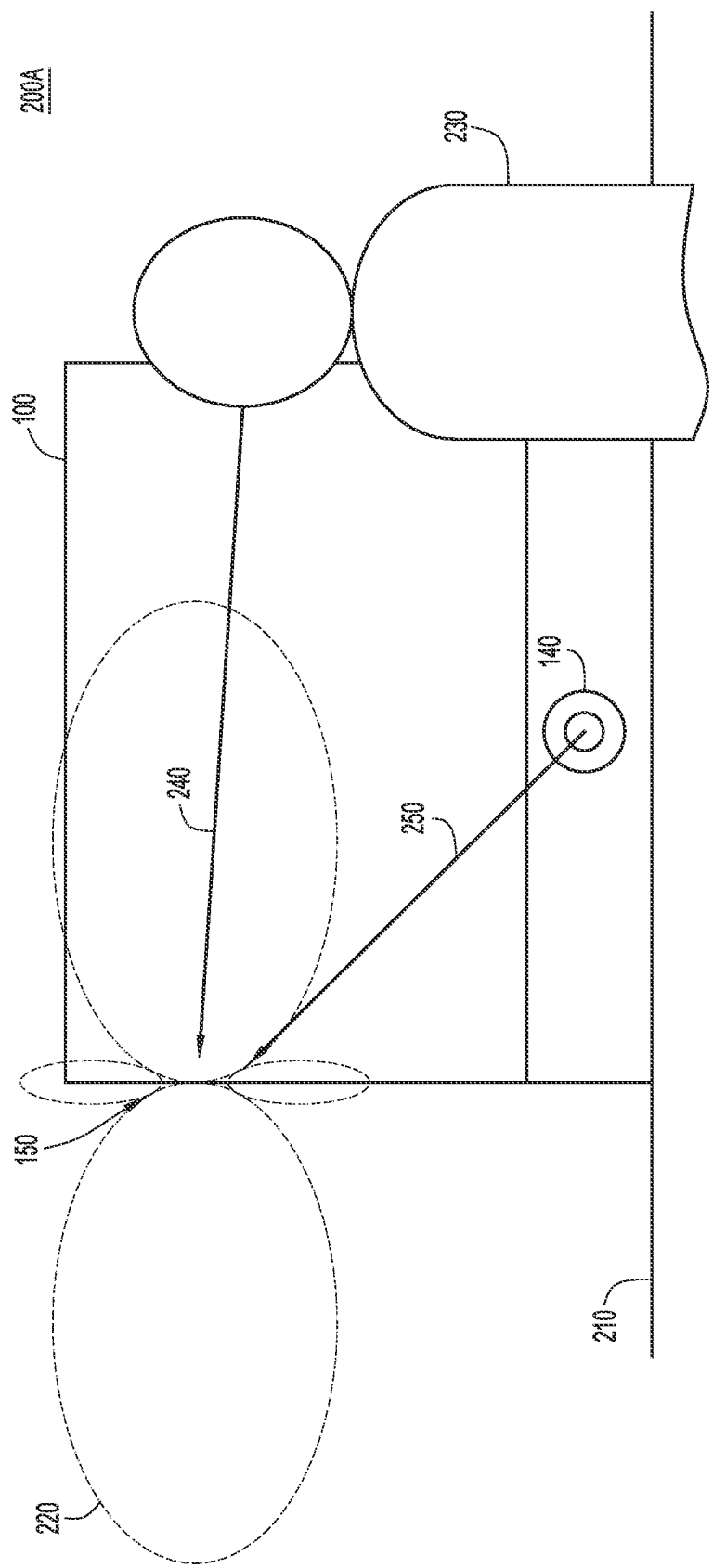
FIGS. 2A-2D illustrate respective use case scenarios in which a video endpoint is configured to obtain audio from a vertical microphone array of the video endpoint in the presence of various vertically-displayed sound sources, according to an example embodiment.

In one example embodiment, a video endpoint is provided that includes a vertical microphone array and a horizontal microphone array. The video endpoint obtains, from the vertical microphone array, a first audio signal including audio from a target sound source and audio from a horizontally-displaced sound source. The video endpoint obtains, from the horizontal microphone array, a second audio signal and a third audio signal both including the audio from the target sound source and the audio from the horizontally-displaced sound source. Based on the second audio signal and the third audio signal, the video endpoint determines at least one of a first degree of arrival of the audio from the target sound source or a second degree of arrival of the audio from the horizontally-displaced sound source. Based on the at least one of the first degree of arrival or the second degree of arrival, the video endpoint adjusts a gain of the first audio signal.

Example Embodiments

FIG. 1 illustrates an example video endpoint 100 configured to process audio signals based on a particular microphone arrangement. Video endpoint 100 includes a housing 110, a camera 120, a display panel or display screen 130, a loudspeaker 140, a vertical microphone array 150, and a horizontal microphone array 160. Housing 110 supports/protects/encases one or more of the camera 120, display screen 130, loudspeaker 140, vertical microphone array 150, and horizontal microphone array 160. Camera 120 is configured to capture video (e.g., video of a user of video endpoint 100). Display screen 130 is configured to present an image (e.g., an image of a second user of a remote video endpoint). Loudspeaker 140 is configured to output audio (e.g., audio produced by the second user), and may comprise one or more loudspeaker sub-assemblies.

Vertical microphone array 150 may be positioned along a vertical side (e.g., a bezel) of display screen 130. Vertical microphone array 150 includes, for example, microphones 150(1)-150(6). Microphones 150(1)-150(6) may be non-uniformly spaced Micro-Electro-Mechanical Systems (MEMS) microphones configured for fixed (non-adaptive) differential filter-and-sum beamforming. In one non-limiting example, microphone 150(1) is vertically displaced by a height of 217 mm from the bottom of video endpoint 100; microphone 150(2) is vertically displaced a height of 331 mm from the bottom of video endpoint 100; microphone 150(3) is vertically displaced a height of 369 mm from the bottom of video endpoint 100; microphone 150(4) is vertically displaced a height of 388 mm from the bottom of video endpoint 100; microphone 150(5) is vertically displaced a height of 407 mm from the bottom of video endpoint 100; and microphone 150(6) is vertically displaced a height of 445 mm from the bottom of video endpoint 100. In general, vertical microphone array 150 may have any suitable configuration (e.g., any suitable number of microphones vertically displaced at any suitable respective heights from the bottom of video endpoint 100). Furthermore, microphones 150(1)-150(6) may be of any suitable type/size.

Horizontal microphone array 160 may be positioned along a top portion of display screen 130 proximate to camera 120. Horizontal microphone array 160 includes microphones 160(1) and 160(2). Microphones 160(1) and 160(2) may be configured for non-linear suppression of noise. In one non-limiting example, microphones 160(1) and 160(2) are separated by a horizontal distance of 19 mm, although in general horizontal microphone array 160 may have any suitable configuration (e.g., any suitable number of microphones separated by any suitable respective horizontal distances). Furthermore, microphones 160(1) and 160(2) may be of any suitable type/size.

Video endpoint 100 may be configured to communicate, wirelessly or through wired technology such as Ethernet, with one or more other video endpoints, thereby permitting a user of video endpoint 100 to communicate with one or more remote users of the other video endpoints. Video endpoint 100 may be supported by (e.g., placed/rest on, affixed/secured to, etc.) any suitable surface (e.g., a table top). Video endpoint 100 may be implemented in any suitable environment (e.g., in an enterprise environment, such as an open office environment). In one example, video endpoint 100 may have a width 170 of 630 mm and a height 180 of 510 mm, although in general video endpoint 100 may have any suitable dimensions.

Angle 190 may be an angle from a reference horizontal line to a line between an acoustical center of vertical microphone array 150 at high frequencies and loudspeaker 140. In this example, the acoustical center of vertical microphone array 150 at high frequencies is microphone 150(4), and angle 190 is approximately 47°, although in general the acoustical center of vertical microphone array 150 at high frequencies (e.g., 1500 Hz to 20 kHz) may be configured/located at any suitable position, and angle 190 may be any suitable angle.

Conventional video endpoint designs often fail to provide high-quality, hands-free speech pickup in compact integrated video endpoints for desktops and huddle rooms. For example, the relatively short distance between the loudspeaker and the microphone in these compact integrated video endpoints can degrade Acoustic Echo Cancellation (AEC) double talk performance. Moreover, destructive interference from a table reflection can degrade quality, and user laptops can shield the microphone from user speech. The integrated video conference endpoint can also pick up noise (e.g., interference) from the keyboard and table top, or from nearby coworkers if the endpoint is used in an open office environment.

Accordingly, video endpoint 100 includes audio signal processing logic 195, which causes video endpoint 100 to perform operations for improved hands-free microphone pickup. To that end, video endpoint 100 may process audio signals obtained from vertical microphone array 150 based on phase information obtained from horizontal microphone array 160. This may enable video endpoint 100 to minimize noise (e.g., interference) from noise sound sources while maximizing the audio from a target sound source (e.g., a user).

Briefly, in one example, video endpoint 100 may obtain, from vertical microphone array 150, a first audio signal including audio from a target sound source and audio from a horizontally-displaced sound source. Video endpoint 100 may further obtain, from horizontal microphone array 160, a second audio signal and a third audio signal both including the audio from the target sound source and the audio from the horizontally-displaced sound source. Based on the second audio signal and the third audio signal, video endpoint 100 may determine at least one of a first degree of arrival (e.g., a first horizontal degree of arrival) of the audio from the target sound source or a second degree of arrival (e.g., a second horizontal degree of arrival) of the audio from the horizontally-displaced sound source. Based on the at least one of the first degree of arrival or the second degree of arrival, video endpoint 100 may adjust a gain of the first audio signal.

Reference is now made to FIGS. 2A-2D with continued reference to FIG. 1. FIGS. 2A-2D illustrate use case scenarios 200A-200D in which video endpoint 100 obtains audio signals via vertical microphone array 150 in the presence of various vertically-displaced sound sources (e.g., vertically-displaced noise sources). In each use case scenario 200A-200D, there is video endpoint 100 and surface 210 (e.g., a table top) configured to support video endpoint 100. In these examples, vertical microphone array 150 is configured to generate vertically-symmetric directivity pattern 220. Vertical microphone array 150 may generate vertically-symmetric directivity pattern 220 using any suitable technique (e.g., beamforming techniques). In this example, vertically-symmetric directivity pattern 220 is a toroid that is symmetric around a vertical axis of vertical microphone array 150, although any suitable vertically-symmetric directivity pattern may be any suitable shape (e.g., cardioid), and may depend on the hardware geometry (e.g., transducer locations).

Vertically-symmetric directivity pattern 220 may have a maximum (e.g., minimum suppression) along a predicted vertical displacement of a target sound source. In use case scenarios 200A-200C, the target sound source is user 230, and audio 240 is produced by user 230. Audio 240 may be speech directed to a remote user in a video facilitated by video endpoint 100. Vertically-symmetric directivity pattern 220 also may have a null (e.g., maximum suppression) along a predicted vertical displacement of a vertically-displaced sound source.

FIGS. 2A-2D illustrate different examples of vertically-displaced sound sources. In FIG. 2A, the vertically-displaced sound source is loudspeaker 140. Loudspeaker 140 produces audio 250, which may be speech directed to user 230 from a remote user in a session in which video endpoint 100 participates. Audio 250 may arrive at vertical microphone array 150 at angle 190 (or a similar angle). Thus, vertically-symmetric directivity pattern 220 may have a null at angle 190 (or a similar angle). Because the null is pointed toward loudspeaker 140, vertically-symmetric directivity pattern 220 may improve the Echo-to-Near-end Ratio (ENR) of video endpoint 100 by suppressing audio 250 for improved Acoustic Echo Cancellation (AEC) performance. In this example, "near-end" refers to audio 240 and "echo" refers to audio 250. For instance, filters may be designed for maximum suppression of audio 250.

Figure 2B:
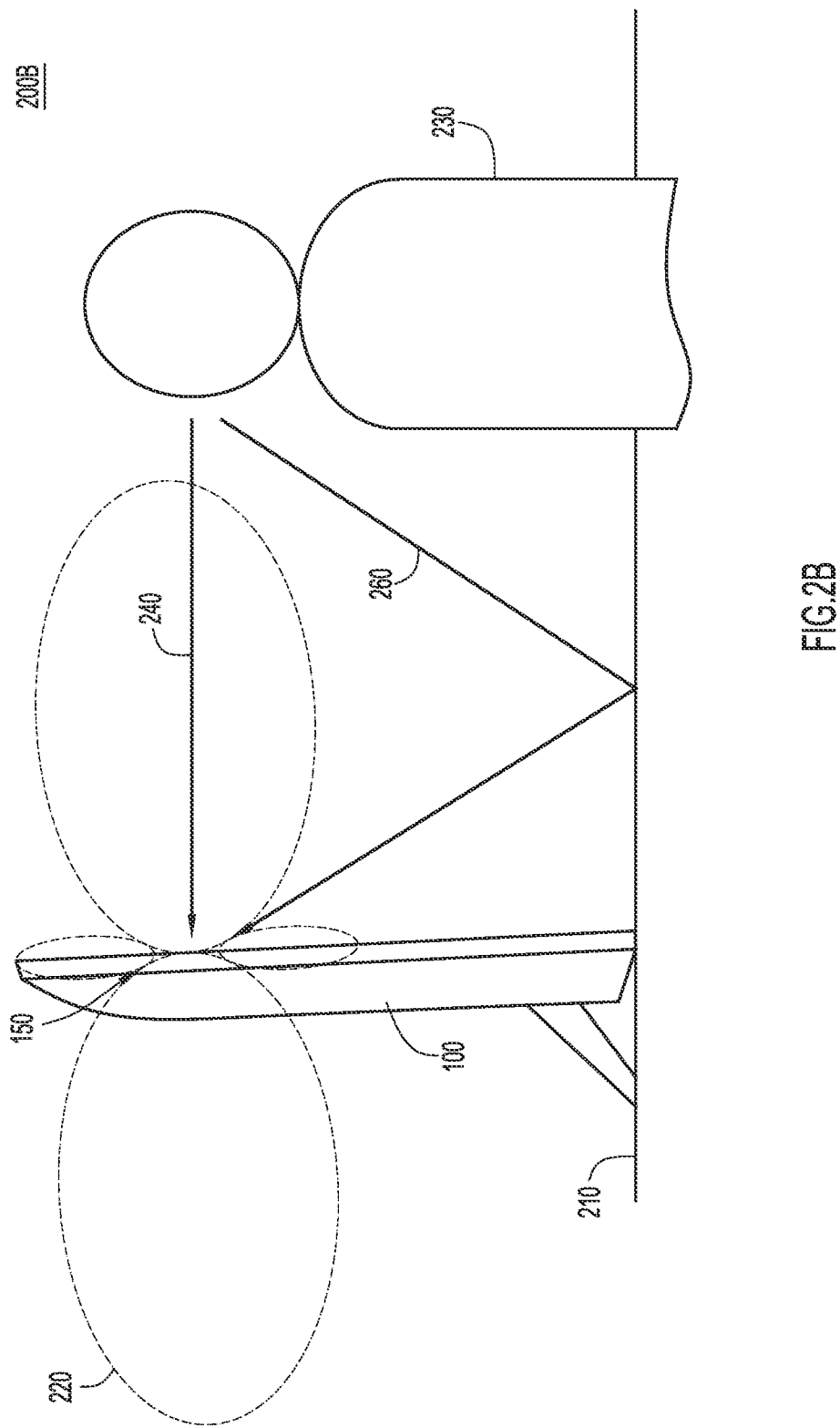

In FIG. 2B, the vertically-displaced sound source is, in combination, user 230 and surface 210. Namely, surface 210 produces reflected audio 260 from user 230 toward vertical microphone array 150. Reflected audio 260 may be speech from user 230 that is intended for a remote user in a session in which video endpoint 100 participates, but arrives at vertical microphone array 150 at a later time than audio 240 due to the longer sound path of reflected audio 260 relative to audio 240. In particular, reflected audio 260 may destructively interfere with audio 240, creating a comb filtering effect. Reflected audio 260 may arrive at vertical microphone array 150 at angle 190 (or a similar angle). Thus, vertically-symmetric directivity pattern 220 may have a null at angle 190 (or a similar angle). Because the null is pointed toward the point at which reflected audio 260 is reflected on surface 210, vertically-symmetric directivity pattern 220 may attenuate reflected audio 260 for improved frequency response and audio quality.

Figure 2C:
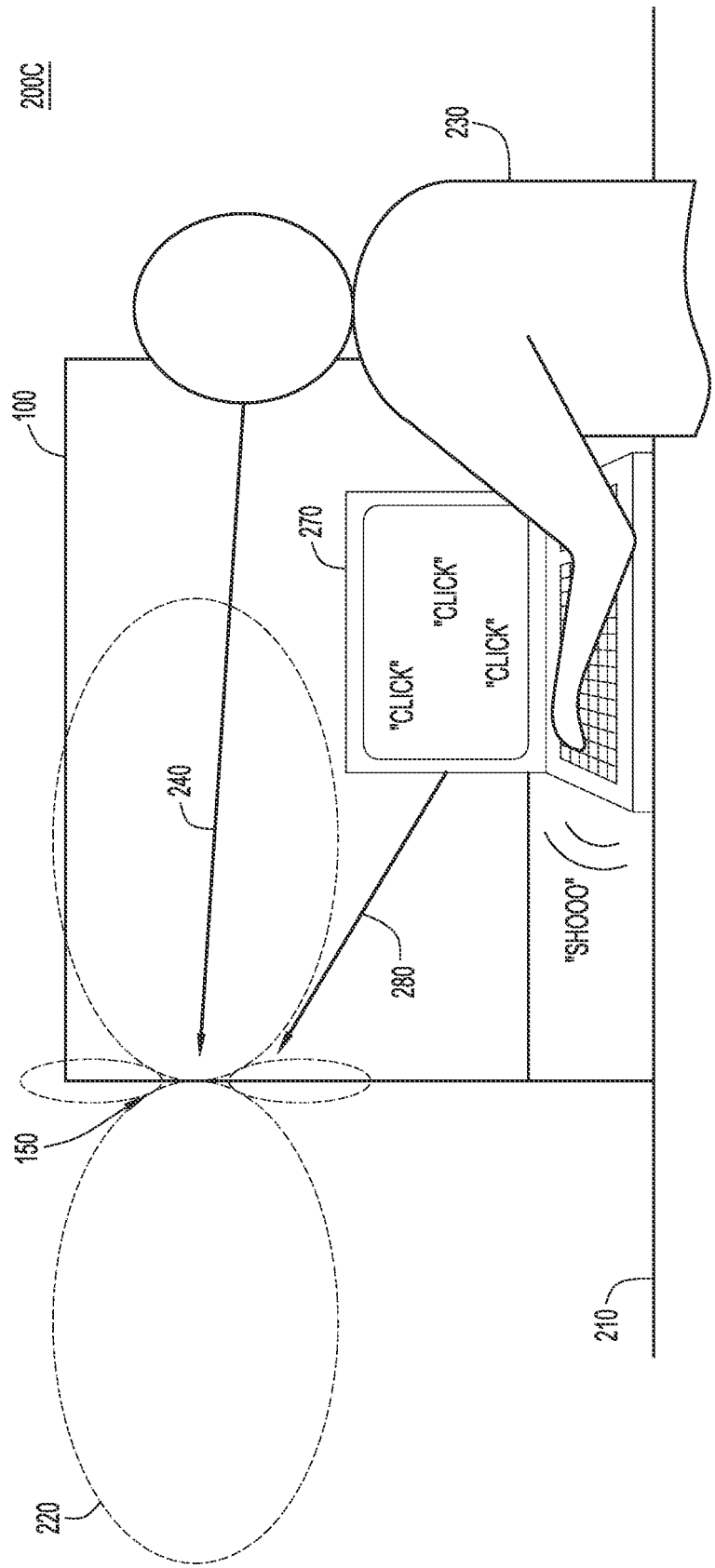

In FIG. 2C, the vertically-displaced sound source is user device 270 (e.g., a laptop). User device 270 produces audio 280, which may be key-clicks and other similar noises caused by user 230 interacting with user device 270. Audio 280 may arrive at vertical microphone array 150 at angle 190 (or a similar angle). Thus, vertically-symmetric directivity pattern 220 may have a null at angle 190 (or a similar angle). Because the null is pointed toward user device 270, vertically-symmetric directivity pattern 220 may attenuate audio 280. Furthermore, the portion of vertical microphone array 150 that is performing mid- and high-frequency pickup may be sufficiently elevated so as to avoid blocking that portion of vertical microphone array 150 with user device 270.

Figure 2D:
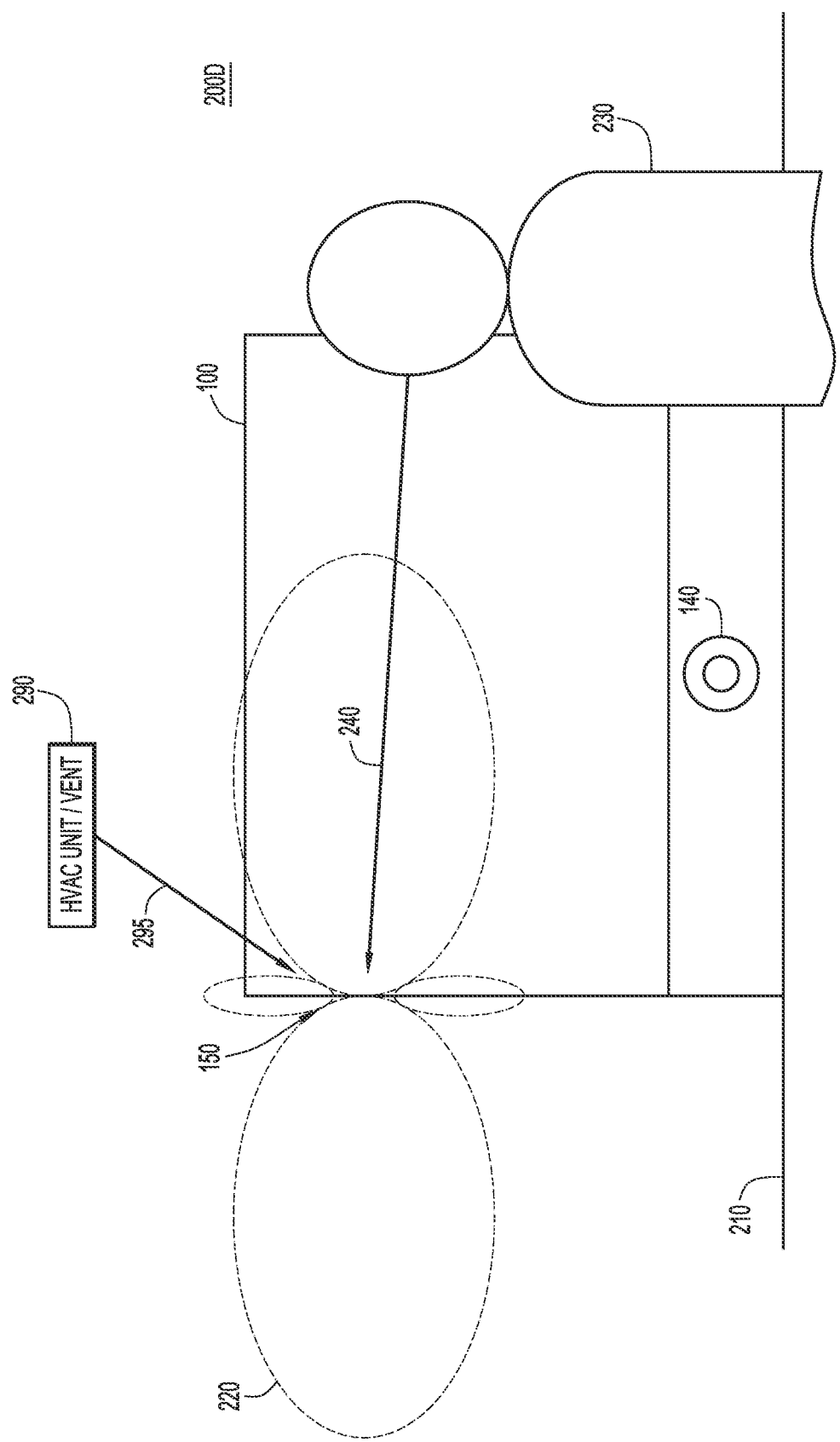

In FIG. 2D, the vertically-displaced sound source is a Heating, Ventilation, and Air Conditioning (HVAC) unit/vent 290 located in a ceiling above video endpoint 100. HVAC unit/vent 290 produces audio 295, which may be noise from HVAC unit/vent 290 turning on or off, air currents, etc. Audio 295 may arrive at vertical microphone array 150 at a null of vertically-symmetric directivity pattern 220 pointed at HVAC unit/vent 290. Vertically-symmetric directivity pattern 220 may thereby attenuate noise from HVAC unit/vent 290.

Reference is now made to FIGS. 3A-3D, with continued reference to FIGS. 1 and 2A-2D. FIGS. 3A-3D illustrate use case scenarios 300A-300D in which video endpoint 100 processes audio based on vertical microphone array 150 and horizontal microphone array 160. Based on the audio obtained via horizontal microphone array 160, video endpoint 100 may determine at least one of a degree of arrival of audio from a target sound source or a degree of arrival of audio from a horizontally-displaced sound source. In use case scenarios 300A-300C, the target sound source includes user 230. User 230 produces audio 240 toward vertical microphone array 150 and audio 310 toward horizontal microphone array 160. Audio 240 and 310 may be speech directed to a remote user in a session facilitated by video endpoint 100.

Turning first to FIG. 3A, video endpoint 100 may obtain audio 310 and determine degree of arrival 320 of audio 310 based on phase information of audio 310. Degree of arrival 320 may depend on a difference between a time at which a first one of microphones 160(1) and 160(2) obtains audio 310, and a time at which a second one of microphones 160(1) and 160(2) obtains audio 310. In one example, if microphones 160(1) and 160(2) obtain audio 310 simultaneously (i.e., the difference is zero), video endpoint 100 may conclude that degree of arrival 320 is 90°.

In the example of use case scenario 300A, the horizontally-displaced sound source is person 330, who may be a co-worker of user 230 in an open office environment. Person 330 may produce audio 340 towards vertical microphone array 150 and audio 350 towards horizontal microphone array 160. Audio 340 and 350 may be noise generated by person 330 in the open office environment (e.g., during a conversation with another co-worker). Video endpoint 100 may obtain audio 350 and determine degree of arrival 360 of audio 350 based on phase information of audio 350. Degree of arrival 360 may depend on a difference between a time at which a first one of microphones 160(1) and 160(2) obtains audio 350, and a time at which a second one of microphones 160(1) and 160(2) obtains audio 350. In one example, microphone 160(1) may obtain audio 350 after microphone 160(2), and as such video endpoint 100 may determine that degree of arrival 360 is less than degree of arrival 320.

In one example, video endpoint 100 may determine that degree of arrival 320 is within range 370 (e.g., an active beam width of horizontal microphone array 160), and that degree of arrival 360 is outside range 370. Range 370 may indicate whether given audio is target sound or noise. Thus, audio 310 is within range 370 because user 230 is standing in a suitable position to use video endpoint 100, and audio 350 is outside range 370 because person 330 is too far from video endpoint 100 to make practical use of video endpoint 100. Range 370 may be preconfigured (e.g., fixed) and/or dynamically adjustable.

Based on degrees of arrival 320 and/or 360, video endpoint 100 may adjust a gain of an audio signal obtained from vertical microphone array 150. The audio signal may include audio 240 and 340. For example, video endpoint 100 may increase an audio level of audio 240 because degree of arrival 320 is within range 370, and/or may attenuate a gain of audio 340 because degree of arrival 360 is outside range 370. The video endpoint 100 may adjust the gain for audio 240 and 340 simultaneously but for different frequency bins.

Video endpoint 100 may process (e.g., adjust the gains of) audio 240 and/or 340 (rather than audio 310 and 350) because vertical microphone array 150 may provide more advantageous properties than horizontal microphone array 160 for the purposes of providing a high-quality audio output signal. For example, due to vertically-symmetric directivity pattern 220, vertical microphone array 150 may have better frequency response, less noise, improved ENR, etc. relative to horizontal microphone array 160. Thus, horizontal microphone array 160 enables time-variant spatial interference suppression by indicating to video endpoint 100 to attenuate horizontally-displaced noise sources in one or more audio signals obtained from vertical microphone array 150. In other words, video endpoint 100 may adjust audio signals obtained from vertical microphone array 150 based on certain characteristics of the audio signals (e.g., degrees of arrival) determined by analyzing similar audio signals obtained from horizontal microphone array 160.

In one example, video endpoint 100 may obtain a video signal from camera 120. Based on the video signal, video endpoint 100 may adjust range 370. Video endpoint may further determine that degree of arrival 360 is outside range 370 and, in response, adjust the gain of the audio signal obtained from vertical microphone array 150. For example, video endpoint 100 may increase the audio level of audio 240 and/or attenuate the gain of audio 340.

In one example, range 370 may be preconfigured to match the field of view of camera 120 (e.g., if camera 120 has a fixed 70° field of view, range 370 may also be fixed at 70°). In another example, video endpoint 100 may adjust range 370 by performing facial recognition on the face of user 230. For instance, video endpoint 100 may adjust range 370 based on the positioning/size of the face of user 230 within the field of view of camera 120. In yet another example, video endpoint 100 may adjust range 370 based on a zoom level of camera 120. For instance, the zoom level of camera 120 may be automatically or manually adjusted (e.g., to change the field of view of camera 120) based on the positioning/size of the face of user 230. Due to the close proximity of horizontal microphone array 160 to camera 120, microphones 160(1) and 160(2) may be mapped to the coordinate system of camera 120 to enable the active horizontal beamwidth to adapt to the zoom level/facial detection.

Figure 3C:
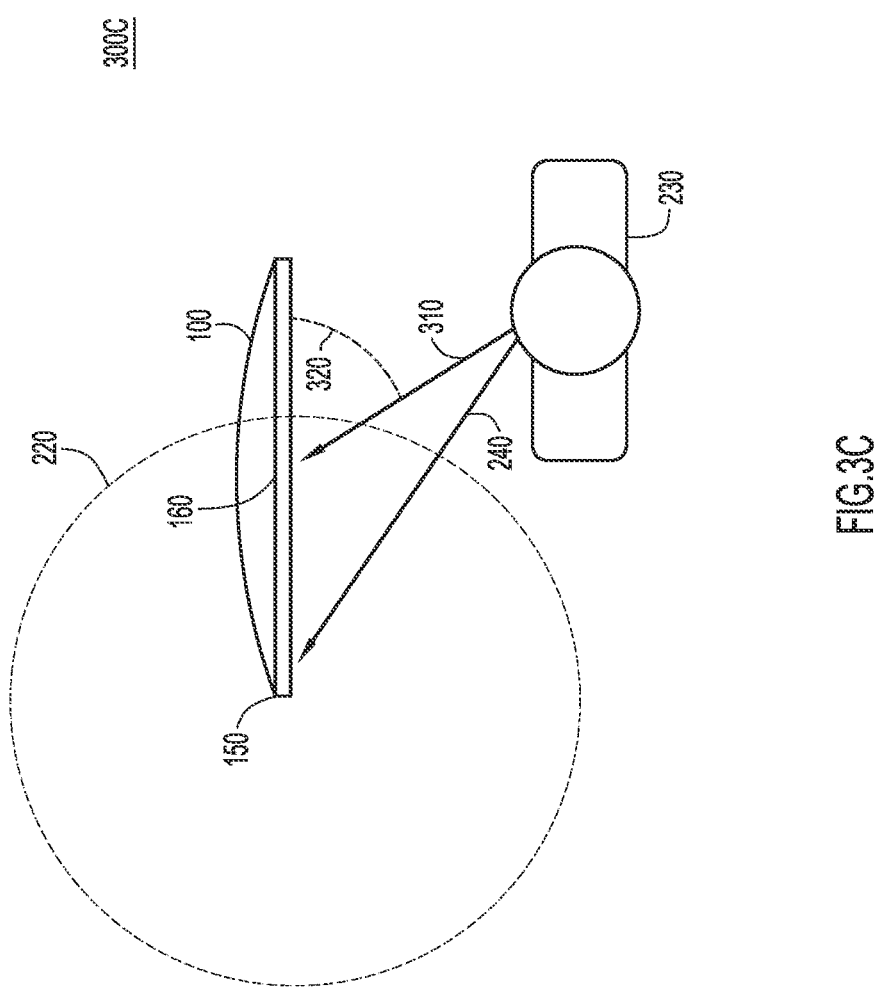

FIGS. 3B and 3C illustrate how, in addition to suppression of noise, degree of arrival 320 may also be used to compensate for the asymmetric location and distance to vertical microphone array 150. In FIG. 3B, video endpoint 100 may obtain audio 310 and determine degree of arrival 320 based on phase information of audio 310. Video endpoint 100 may further determine a horizontal displacement of user 230 based on degree of arrival 320. For example, if degree of arrival 320 is 120°, video endpoint 100 may determine that user 230 is horizontally displaced by 120°. Camera 120 may also assist video endpoint 100 to determine the horizontal displacement of user 230. Video endpoint 100 may further adjust the gain of the audio signal obtained from vertical microphone array 150 based on the horizontal displacement of user 230. For example, a horizontal displacement of 120° for user 230 may indicate that user 230 is in close proximity to vertical microphone array 150, which may cause audio 240 to sound relatively loud at a remote video endpoint.

Accordingly, video endpoint 100 may attenuate the gain of audio 240 to account for the close proximity of user 230 to vertical microphone array 150.

In FIG. 3C, video endpoint 100 may obtain audio 310 and determine degree of arrival 320 based on phase information of audio 310. Video endpoint 100 may further determine a horizontal displacement of user 230 based on degree of arrival 320. For example, if degree of arrival 320 is 60°, video endpoint 100 may determine that user 230 is horizontally displaced by 60°. Camera 120 may also assist video endpoint 100 to determine the horizontal displacement of user 230. Video endpoint 100 may further adjust the gain of the audio signal obtained from vertical microphone array 150 based on the horizontal displacement of user 230. For example, a horizontal displacement of 60° for user 230 may indicate that user 230 is far from vertical microphone array 150, which may cause audio 240 to sound relatively quiet on the far end. Accordingly, video endpoint 100 may increase the audio level of audio 240 to account for the relatively far distance of user 230 to vertical microphone array 150.

In the example of FIG. 3D, user 230 and person 330 are both users participating in a session in which video endpoint 100 participates, and audio 240, 310, 340, and 350 are directed to a user at a remote video endpoint in the session. In this example, video endpoint 100 may adjust the gain of the audio signal obtained from vertical microphone array 150 to equalize the audio levels of audio 240 and 340. For instance, video endpoint 100 may determine a horizontal displacement of user 230 based on degree of arrival 320, and a horizontal displacement of person 330 based on degree of arrival 360. Camera 120 may also assist video endpoint 100 to determine the horizontal displacement of user 230. Based on degrees of arrival 320 and 360, video endpoint 100 may determine that user 230 is in proximity to vertical microphone array 150, and that person 330 is relatively far from vertical microphone array 150. Accordingly, video endpoint 100 may attenuate the gain of audio 240 and/or increase the audio level of audio 340 to equalize audio 240 and 340. This may have the effect of causing audio 240 and 340 to have substantially similar/equal audio levels at the far end.

In accordance with techniques described herein, linear beamforming may be performed in the vertical plane (e.g., via vertical microphone array 150) and non-linear suppression may be performed in the horizontal plane (e.g., via horizontal microphone array 160). This is because most unwanted sources in the vertical plane may be reasonably time-invariant and/or fixed in space (e.g., loudspeakers, HVAC noises, key-clicks, table reflections, etc.), whereas the noise suppression in the horizontal plane may vary both in space and time, and in some scenarios may not be needed or desired at all. Although degrees of arrival described herein are angles relative to reference horizontal lines, any suitable reference line(s) may be used to determine a degree of arrival. Furthermore, the degree of arrival may be determined based on preconfigured settings relating phase difference to degree of arrival, and/or based on any suitable factors (e.g., room temperature, air pressure, frequency makeup of the audio signal, etc.).

Figure 4:
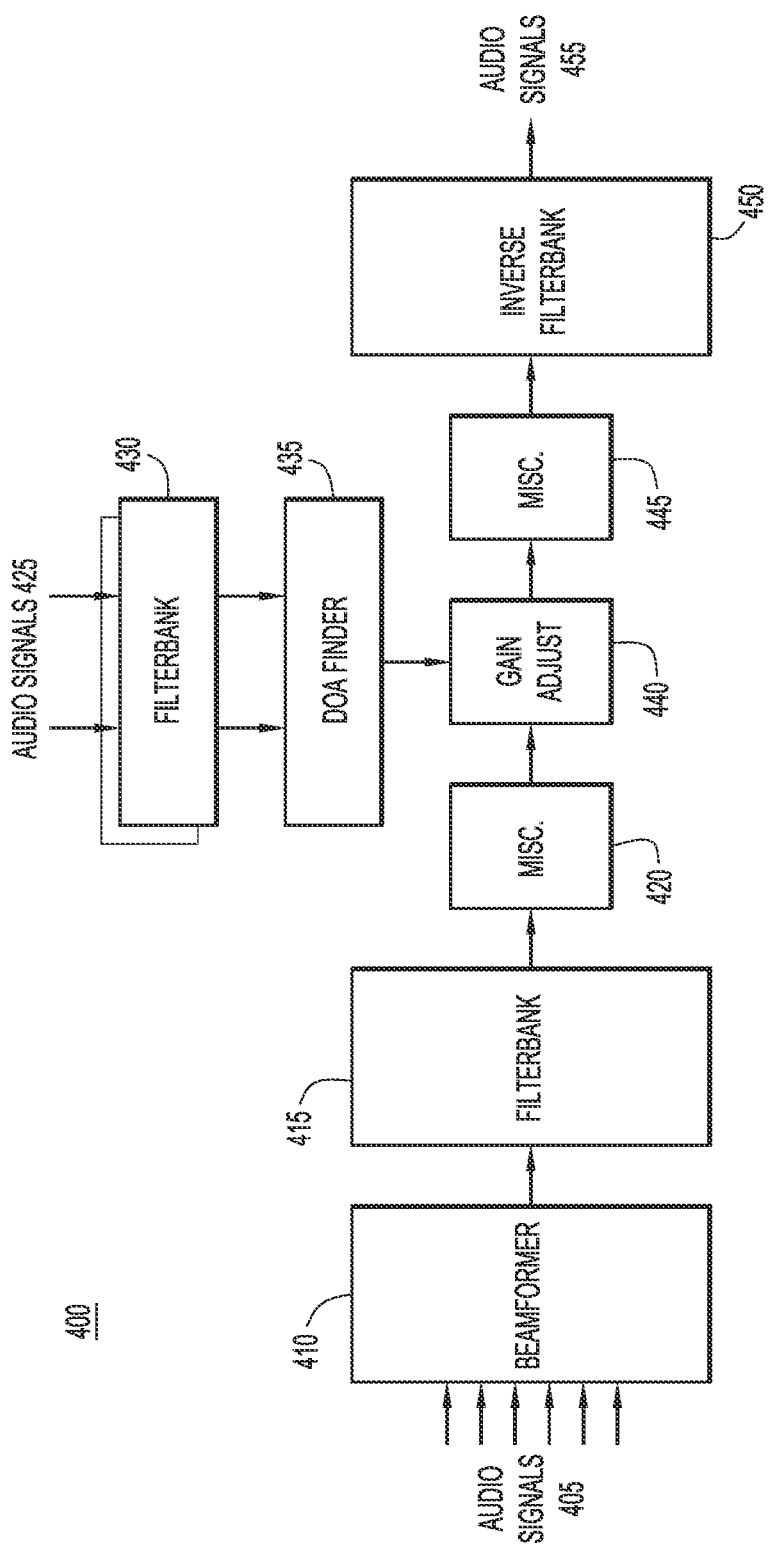
FIG. 4 is a block diagram depicting an audio signal processing flow based on a microphone arrangement of a video endpoint, according to an example embodiment.

FIG. 4 illustrates an example audio signal processing flow 400 based on a microphone arrangement of video endpoint 100. The operations of signal processing flow 400 may be performed by suitable hardware and/or software of the video endpoint 100. Reference is also made to FIG. 1 for purposes of the description of FIG. 4. At 405, video endpoint 100 obtains audio signals from vertical microphone array 150 (e.g., six respective audio signals from microphones 150(1)-150(6)). The audio signals may include audio from a target sound source and audio from a horizontally-displaced sound source. At 410, the audio signals pass through a beamformer, and at 415 enter a filter bank. At 420, video endpoint 100 performs miscellaneous operations on the audio signals (e.g., echo cancellation, Automatic Gain Control (AGC), equalization, motion detection, diagnostic functions, etc.). The miscellaneous operations may be performed in one channel for streamlined processing.

At 425, video endpoint 100 obtains audio signals from horizontal microphone array 160 (e.g., one audio signal from microphone 160(1) and one audio signal from microphone 160(2)). Both audio signals may include the audio from the target sound source and the audio from the horizontally-displaced sound source At 430, the audio signals enter a filter bank. The filter bank may divide the audio signals into different frequency bins. At 435, a degree of arrival finder determines at least one of a first degree of arrival of the audio from the target sound source or a second degree of arrival of the audio from the horizontally-displaced sound source. The degree of arrival finder may calculate the phase difference for each time and frequency band block and convert the phase difference to an angle corresponding to the first and/or second degrees of arrival. The degree(s) of arrival may differ for each frequency sub-band. For example, the voice of a co-worker may have a different degree of arrival than the voice of the user, and the voices may be distinguishable based on frequency.

At 440, video endpoint 100 may adjust the gain of the audio signal obtained from vertical microphone array 150. Video endpoint 100 may adjust the gain based on the first and/or second degrees of arrival. For instance, for each time/frequency bin, a mathematical directivity function may be applied based on the angle (e.g., using smoothing vectors, inter-band gain limits, etc.). Thus, in one example, video endpoint 100 determines the degree(s) of arrival in the horizontal plane and provides non-linear spatial interference suppression for the audio signals obtained from vertical microphone array 150. At 445, video endpoint 100 performs miscellaneous operations on the audio signals (e.g., echo cancellation, Automatic Gain Control (AGC), equalization, motion detection, diagnostic functions, etc.). The miscellaneous operations may be performed in one channel for streamlined processing. At 450, the audio signals pass through an inverse filter bank, and at 455 video endpoint 100 outputs the audio signals (e.g., toward a remote video endpoint).

Figure 5:
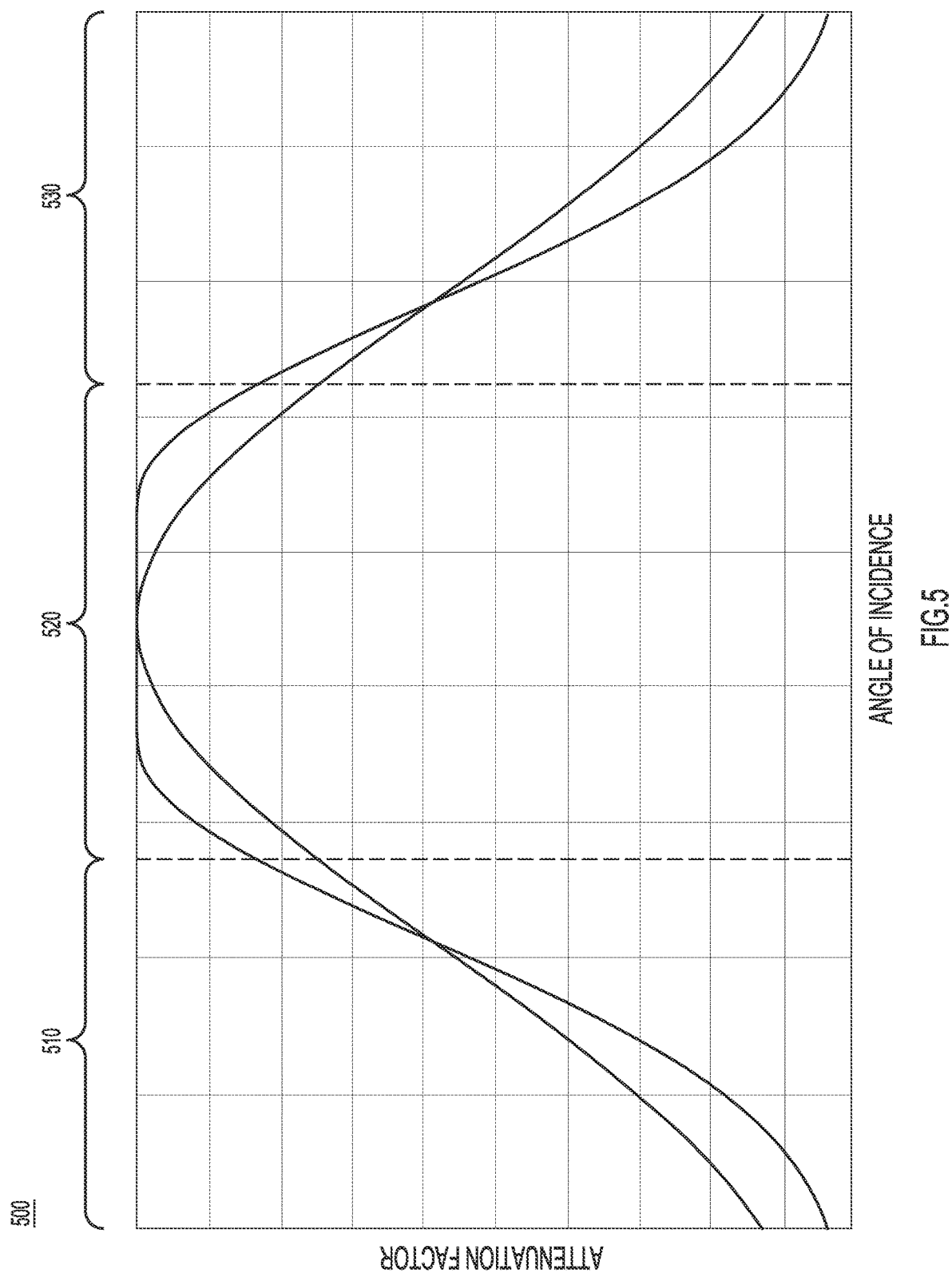
FIG. 5 illustrates a plot showing mathematical directivity functions that may be applied to one or more audio signals, according to an example embodiment.

FIG. 5 illustrates an example plot 500 showing mathematical directivity functions 540 and 550 that may be applied at 440 (FIG. 4). In particular, the y-axis of plot 500 corresponds to the attenuation factor, and the x-axis of plot 500 corresponds to the degree of arrival of the audio. Plot 500 is divided into area 510, area 520, and area 530. Area 520 may represent a range of degrees of arrival for which the beam width of a horizontal microphone array is active. Thus, any audio signals within area 520 may be treated as target audio signals, and any audio signals outside area 520 may be treated as noise. In one example, video endpoint 100 may apply mathematical directivity functions 540 and/or 550 for any audio signals that have any given degree of arrival. In another example, video endpoint 100 may apply mathematical directivity functions 540 and/or 550 for any audio signals that have a degree of arrival that corresponds to an angle of incidence within area 520, and may apply an attenuation factor of zero to audio signals that have a degree of arrival that corresponds to an angle of incidence within areas 510 and/or 530.

In one example, area 520 may be adjusted based on a camera. For instance, if the camera zooms in, the width of area 520 may decrease with the camera field of view. In another example, the width of area 520 may be adjusted based on facial recognition. For instance, the width of area 520 may be increased or decreased to include the entire face of the user. Adjusting the width of area 520 may prompt video endpoint 100 to modify mathematical directivity functions 540 and/or 550, or switch from one of mathematical directivity functions 540 and/or 550 to the other of mathematical directivity functions 540 and/or 550.

Figure 6:
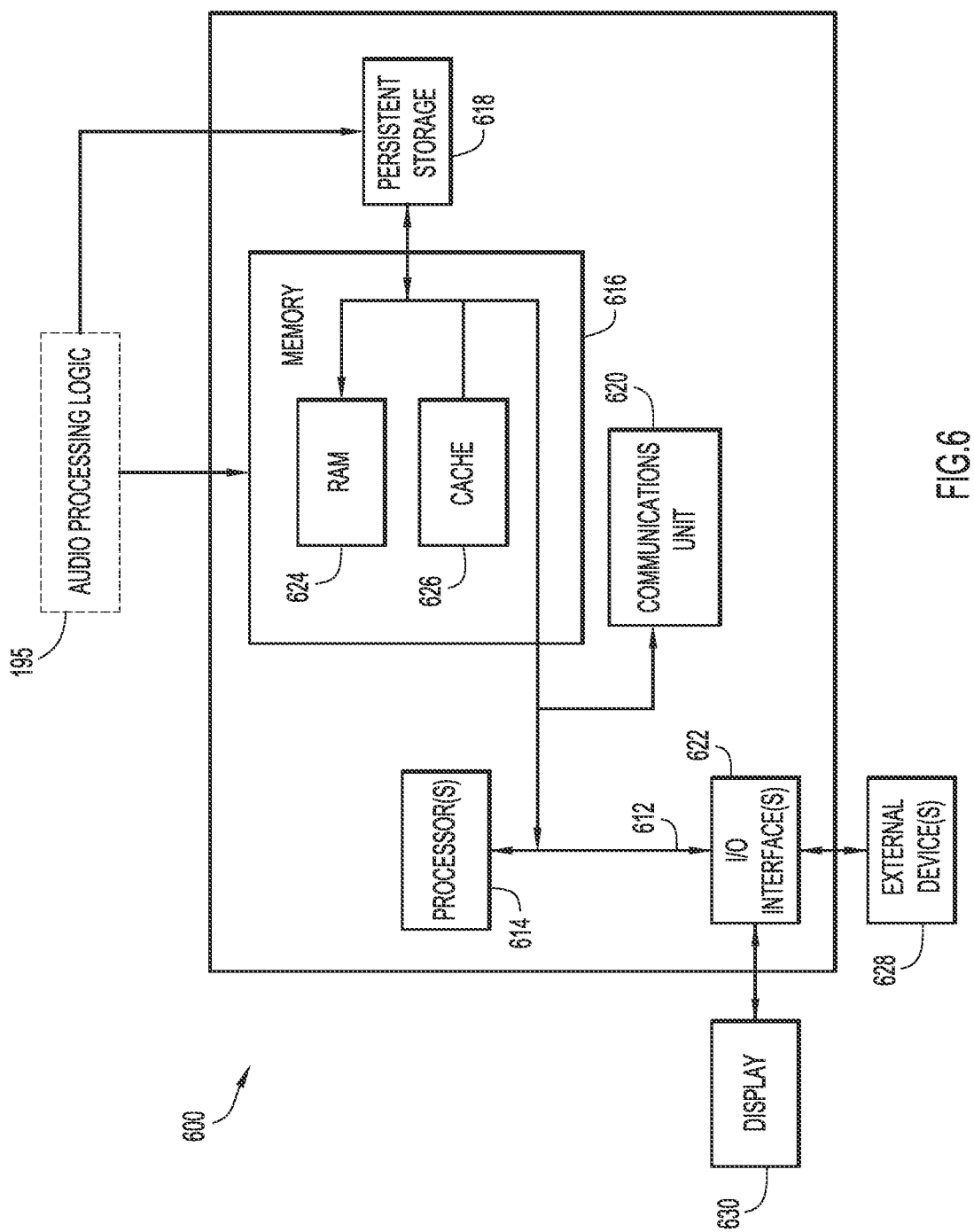
FIG. 6 illustrates a block diagram of a computing device configured to process audio signals based on a microphone arrangement of the computing device, according to an example embodiment.

FIG. 6 illustrates a hardware block diagram of an example device 600 (e.g., video endpoint 100). It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and Input/Output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes Random Access Memory (RAM) 624 and cache memory 626. In general, memory 616 can include any suitable volatile or non-volatile computer readable storage media. Instructions for audio signal processing logic 195 may be stored in memory 616 or persistent storage 618 for execution by computer processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to device 600. For example, I/O interface(s) 622 may provide a connection to external devices 628 such as a keyboard, camera, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a display screen of a video endpoint.

Figure 7:
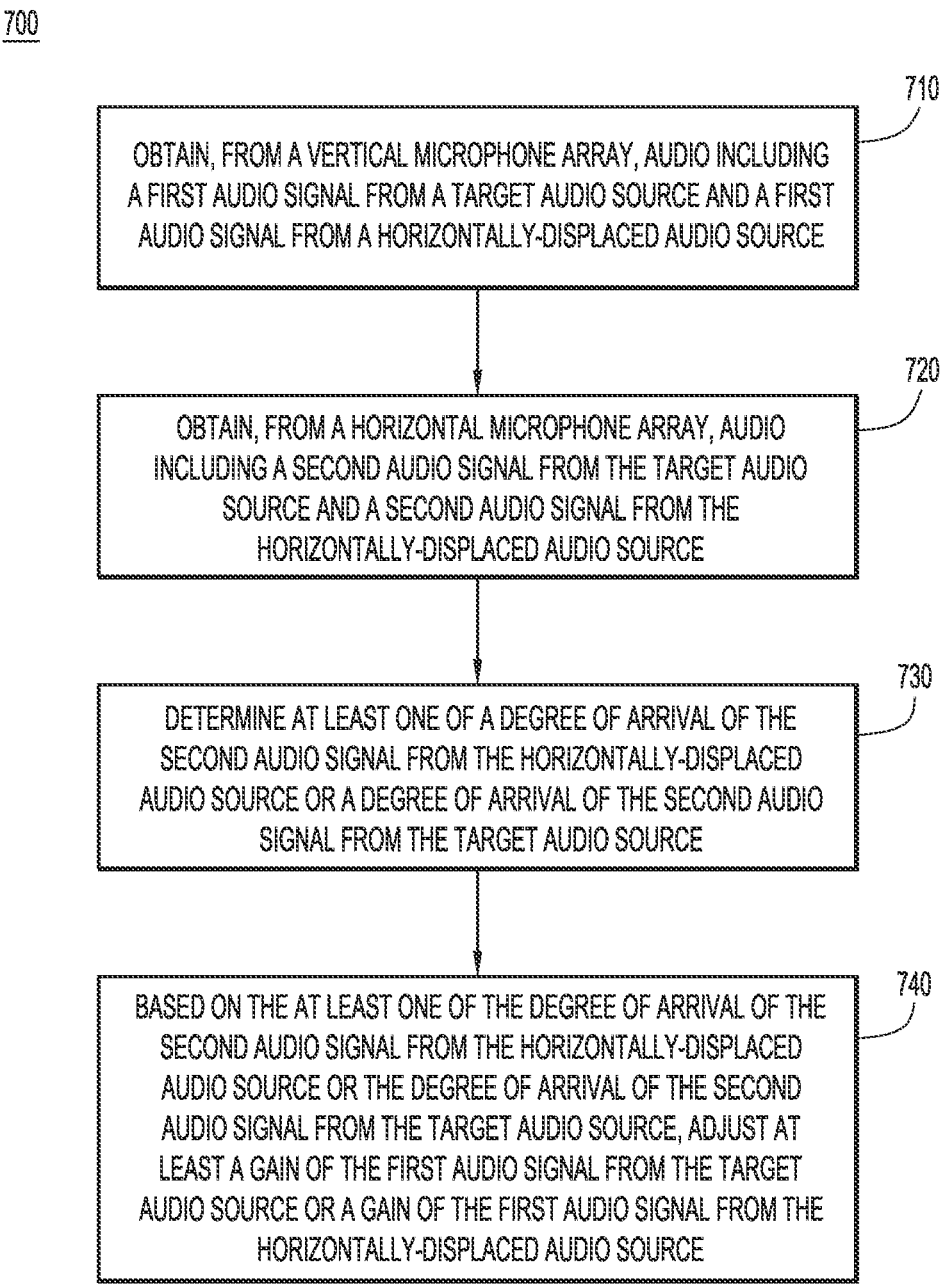
FIG. 7 illustrates a flowchart of a method for processing audio signals based on a microphone arrangement of a video endpoint, according to an example embodiment.

FIG. 7 is a flowchart of an example method 700 for processing audio signals based on a microphone arrangement of a video endpoint. At 710, the video endpoint obtains, from a vertical microphone array, a first audio signal including audio from a target sound source and audio from a horizontally-displaced sound source. At 720, the video endpoint obtains, from a horizontal microphone array, a second audio signal and a third audio signal both including the audio from the target sound source and the audio from the horizontally-displaced sound source. At 730, based on the second audio signal and the third audio signal, the video endpoint determines at least one of a first degree of arrival of the audio from the target sound source or a second degree of arrival of the audio from the target horizontally-displaced sound source. At 740, based on the at least one of the first degree of arrival or the second degree of arrival, the video endpoints adjusts a gain of the first audio signal.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one form, an apparatus is provided. The apparatus comprises: a vertical microphone array; a horizontal microphone array; and a processor coupled to the vertical microphone array and to the horizontal microphone array, wherein the processor is configured to: obtain, from the vertical microphone array, a first audio signal including audio from a target sound source and audio from a horizontally-displaced sound source; obtain, from the horizontal microphone array, a second audio signal and a third audio signal both including the audio from the target sound source and the audio from the horizontally-displaced sound source; based on the second audio signal and the third audio signal, determine at least one of a first degree of arrival of the audio from the target sound source or a second degree of arrival of the audio from the horizontally-displaced sound source; and based on the at least one of the first degree of arrival or the second degree of arrival, adjust a gain of the first audio signal.

In one example, the apparatus further comprises a camera, and the processor is further configured to: obtain a video signal from the camera; based on the video signal, adjust a range of degrees of arrival; determine that the second degree of arrival is outside the range of degrees of arrival; and in response to determining that the second degree of arrival is outside the range of degrees of arrival, adjust the gain of the first audio signal by increasing an audio level of the audio from the target sound source or attenuating a gain of the audio from the horizontally-displaced sound source. In a further example, the video signal includes a video feed of the target sound source, the target sound source includes a face of a user, and the processor is further configured to: adjust the range of degrees of arrival by performing facial recognition on the face of the user. In another further example, the processor is further configured to: adjust the range of degrees of arrival based on a zoom level of the camera.

In one example, the processor is further configured to: based on the first degree of arrival, determine a horizontal displacement of the target sound source relative to the vertical microphone array; and adjust the gain of the first audio signal based on the horizontal displacement of the target sound source relative to the vertical microphone array.

In one example, the processor is further configured to: based on the at least one of the first degree of arrival or the second degree of arrival, adjust the gain of the first audio signal to equalize an audio level of the audio from the target sound source and an audio level of the audio from the horizontally-displaced sound source.

In one example, the processor is further configured to: use beamforming techniques to generate, via the vertical microphone array, a vertically-symmetric directivity pattern having a maximum along a predicted vertical displacement of the target sound source and a null along a predicted vertical displacement of a vertically-displaced sound source. In a further example, the apparatus further comprises a loudspeaker, wherein the vertically-displaced sound source includes at least one of the loudspeaker, a surface configured to support the apparatus, or a user device on the surface.

In one example, the apparatus is a video endpoint that includes a housing that supports a display screen, and wherein the vertical microphone array is positioned along a vertical side of the display screen and the horizontal microphone array is positioned along a top portion of the display screen proximate to a video camera of the video endpoint.

In another form, a method is provided. The method comprises: obtaining, from a vertical microphone array, a first audio signal including audio from a target sound source and audio from a horizontally-displaced sound source;

obtaining, from a horizontal microphone array, a second audio signal and a third audio signal both including the audio from the target sound source and the audio from the horizontally-displaced sound source; based on the second audio signal and the third audio signal, determining at least one of a first degree of arrival of the audio from the target sound source or a second degree of arrival of the audio from the horizontally-displaced sound source; and based on the at least one of the first degree of arrival or the second degree of arrival, adjusting a gain of the first audio signal.

In another form, one or more non-transitory computer readable storage media are provided. The non-transitory computer readable storage media are encoded with instructions that, when executed by a processor, cause the processor to: obtain, from a vertical microphone array, a first audio signal including audio from a target sound source and audio from a horizontally-displaced sound source; obtain, from a horizontal microphone array, a second audio signal and a third audio signal both including the audio from the target sound source and the audio from the horizontally-displaced sound source; based on the second audio signal and the third audio signal, determine at least one of a first degree of arrival of the audio from the target sound source or a second degree of arrival of the audio from the horizontally-displaced sound source; and based on the at least one of the first degree of arrival or the second degree of arrival, adjust a gain of the first audio signal.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
    a vertical microphone array;
    a horizontal microphone array; and
    a processor coupled to the vertical microphone array and to the horizontal microphone array, wherein the processor is configured to:
        obtain, from the vertical microphone array, a first audio signal including audio from a target sound source and audio from a horizontally-displaced sound source;
        obtain, from the horizontal microphone array, a second audio signal and a third audio signal both including the audio from the target sound source and the audio from the horizontally-displaced sound source;
        based on the second audio signal and the third audio signal, determine at least one of a first degree of arrival of the audio from the target sound source or a second degree of arrival of the audio from the horizontally-displaced sound source; and
        based on the at least one of the first degree of arrival or the second degree of arrival, adjust a gain of the first audio signal.

2. The apparatus of claim 1, further comprising a camera, wherein the processor is further configured to:
    obtain a video signal from the camera;
    based on the video signal, adjust a range of degrees of arrival;
    determine that the second degree of arrival is outside the range of degrees of arrival; and
    in response to determining that the second degree of arrival is outside the range of degrees of arrival, adjust the gain of the first audio signal by increasing an audio level of the audio from the target sound source or attenuating a gain of the audio from the horizontally-displaced sound source.

3. The apparatus of claim 2, wherein the video signal includes a video feed of the target sound source, wherein the target sound source includes a face of a user, and wherein the processor is further configured to:
    adjust the range of degrees of arrival by performing facial recognition on the face of the user.

4. The apparatus of claim 2, wherein the processor is further configured to:
    adjust the range of degrees of arrival based on a zoom level of the camera.

5. The apparatus of claim 1, wherein the processor is further configured to:
    based on the first degree of arrival, determine a horizontal displacement of the target sound source relative to the vertical microphone array; and
    adjust the gain of the first audio signal based on the horizontal displacement of the target sound source relative to the vertical microphone array.

6. The apparatus of claim 1, wherein the processor is further configured to:
    based on the at least one of the first degree of arrival or the second degree of arrival, adjust the gain of the first audio signal to equalize an audio level of the audio from the target sound source and an audio level of the audio from the horizontally-displaced sound source.

7. The apparatus of claim 1, wherein the processor is further configured to:
    use beamforming techniques to generate, via the vertical microphone array, a vertically-symmetric directivity pattern having a maximum along a predicted vertical displacement of the target sound source and a null along a predicted vertical displacement of a vertically-displaced sound source.

8. The apparatus of claim 7, further comprising a loudspeaker, wherein the vertically-displaced sound source includes at least one of the loudspeaker, a surface configured to support the apparatus, or a user device on the surface.

9. The apparatus of claim 1, wherein the apparatus is a video endpoint that includes a housing that supports a display screen, and wherein the vertical microphone array is positioned along a vertical side of the display screen and the horizontal microphone array is positioned along a top portion of the display screen proximate to a video camera of the video endpoint.

10. A method comprising:
    obtaining, from a vertical microphone array, a first audio signal including audio from a target sound source and audio from a horizontally-displaced sound source;
    obtaining, from a horizontal microphone array, a second audio signal and a third audio signal both including the audio from the target sound source and the audio from the horizontally-displaced sound source;

based on the second audio signal and the third audio signal, determining at least one of a first degree of arrival of the audio from the target sound source or a second degree of arrival of the audio from the horizontally-displaced sound source; and based on the at least one of the first degree of arrival or the second degree of arrival, adjusting a gain of the first audio signal.

11. The method of claim 10, further comprising:

obtaining a video signal from a camera;

based on the video signal, adjusting a range of degrees of arrival;

determining that the second degree of arrival is outside the range of degrees of arrival; and in response to determining that the second degree of arrival is outside the range of degrees of arrival, adjusting the gain of the first audio signal by increasing an audio level of the audio from the target sound source or attenuating a gain of the audio from the horizontally-displaced sound source.

12. The method of claim 11, wherein the video signal includes a video feed of the target sound source, and the target sound source includes a face of a user, the method further comprising:

adjusting the range of degrees of arrival by performing facial recognition on the face of the user.

13. The method of claim 11, further comprising:

adjusting the range of degrees of arrival based on a zoom level of the camera.

14. The method of claim 10, further comprising:

based on the first degree of arrival, determining a horizontal displacement of the target sound source relative to the vertical microphone array; and adjusting the gain of the first audio signal based on the horizontal displacement of the target sound source relative to the vertical microphone array.

15. The method of claim 10, further comprising:

based on the at least one of the first degree of arrival or the second degree of arrival, adjusting the gain of the first audio signal to equalize an audio level of the audio from the target sound source and an audio level of the audio from the horizontally-displaced sound source.

16. The method of claim 10, further comprising:

using beamforming techniques to generate, via the vertical microphone array, a vertically-symmetric directivity pattern having a maximum along a predicted vertical displacement of the target sound source and a null along a predicted vertical displacement of a vertically-displaced sound source.

17. One or more non-transitory computer readable storage media encoded with instructions that, when executed by a processor, cause the processor to:

obtain, from a vertical microphone array, a first audio signal including audio from a target sound source and audio from a horizontally-displaced sound source;

obtain, from a horizontal microphone array, a second audio signal and a third audio signal both including the audio from the target sound source and the audio from the horizontally-displaced sound source;

based on the second audio signal and the third audio signal, determine at least one of a first degree of arrival of the audio from the target sound source or a second degree of arrival of the audio from the horizontally-displaced sound source; and based on the at least one of the first degree of arrival or the second degree of arrival, adjust a gain of the first audio signal.

18. The one or more non-transitory computer readable storage media of claim 17, wherein the instructions further cause the processor to:

obtain a video signal from a camera;

based on the video signal, adjust a range of degrees of arrival;

determine that the second degree of arrival is outside the range of degrees of arrival; and in response to determining that the second degree of arrival is outside the range of degrees of arrival, adjust the gain of the first audio signal by increasing an audio level of the audio from the target sound source or attenuating a gain of the audio from the horizontally-displaced sound source.

19. The one or more non-transitory computer readable storage media of claim 17, wherein the instructions further cause the processor to:

based on the first degree of arrival, determine a horizontal displacement of the target sound source relative to the vertical microphone array; and adjust the gain of the first audio signal based on the horizontal displacement of the target sound source relative to the vertical microphone array.

20. The one or more non-transitory computer readable storage media of claim 17, wherein the instructions further cause the processor to:

based on the at least one of the first degree of arrival or the second degree of arrival, adjust the gain of the first audio signal to equalize an audio level of the audio from the target sound source and the an audio level of the audio from the horizontally-displaced sound source.

* * * * *